US007765145B2

(12) United States Patent
Georgakopoulos

(10) Patent No.: US 7,765,145 B2
(45) Date of Patent: Jul. 27, 2010

(54) METHOD OF OPTIMAL INFORMED TRADING WITH LIMITED COMPETITION

(76) Inventor: Nicholas L. Georgakopoulos, 1254 Laurelwood, Carmel, IN (US) 46032

( * ) Notice: Subject to any disclaimer, the term of this patent is extended or adjusted under 35 U.S.C. 154(b) by 1357 days.

(21) Appl. No.: 11/104,352

(22) Filed: Apr. 11, 2005

(65) Prior Publication Data
US 2006/0229969 A1 Oct. 12, 2006

(51) Int. Cl.
*G06Q 40/00* (2006.01)
(52) U.S. Cl. .......................... 705/37; 705/35; 705/36 R
(58) Field of Classification Search ................... 705/35, 705/36 R, 36 T, 37
See application file for complete search history.

(56) References Cited

U.S. PATENT DOCUMENTS

| | | | | |
|---|---|---|---|---|
| 5,893,069 | A | * | 4/1999 | White, Jr. ........................ 705/1 |
| 6,493,682 | B1 | * | 12/2002 | Horrigan et al. ........... 705/36 R |
| 7,003,483 | B1 | * | 2/2006 | Davis ......................... 705/36 R |
| 7,136,833 | B1 | * | 11/2006 | Podsiadlo ..................... 705/37 |
| 7,162,447 | B1 | * | 1/2007 | Cushing ....................... 705/37 |
| 2002/0052820 | A1 | * | 5/2002 | Gatto ............................ 705/36 |
| 2004/0236637 | A1 | * | 11/2004 | Tatge et al. .................... 705/26 |
| 2006/0015425 | A1 | * | 1/2006 | Brooks ......................... 705/35 |

OTHER PUBLICATIONS

Estimating the Probability of Informed Trading, Ken Nyholm, The Journal of Financial Research, Winter 2002, vol. XXV, No. 4, pp. 485-505.*
Informed Trading and Order Type, John W. Cooney Jr. and Richard W. Sias, Journal of Banking & Finance 28, Jan. 2004, pp. 1711-1743.*
Informed Trading in Stock and Option Markets, Sugato Chakravarty, Huseyin Gulen and Stewart Mayhew, The Journal of Finance, vol. LIX, No. 3, Jun. 2004, pp. 1235-1257.*
Consolidation, Fragmentation and the Disclosure of Trading Information, Ananth Madhavan, The Review of Financial Studies, Fall 1995, vol. 8, No. 3, pp. 579-603.*
Georgakopoulos, N.L., Insider Trading as a Transactional Cost: A Market Microstructure Justification and Optimization of Insider Trading Regulation, 26 Conn. L. Rev. 1 (1993).
Admati, A.R. and Pfleiderer, P., A Theory of Intraday Patterns: Volume and Price Variability, 1 Rev. Fin. Stud. 3 (1988).
Kyle, A.S., Continuous Auctions and Insider Trading, 53 Econometrica 1315 (1985).
Georgakopoulos, Optimal Informed Trading with Limited Competition (10 pp.), Sep. 10, 2006.

* cited by examiner

*Primary Examiner*—Alexander Kalinowski
*Assistant Examiner*—Gregory Johnson
(74) *Attorney, Agent, or Firm*—Baker & Daniels LLP

(57) ABSTRACT

An improved optimization method for maximizing the profit available to an informed securities or commodities trader as a result of unique information known by the trader about a traded unit which enables the trader to formulate the true per-unit value the security or commodity whereby the effect on the market parameters of a given trading period had by the trader's future trade activity when the trader has knowledge of the specific probabilities that the trader will engage in trade activity during at least one subsequent trading period is taken into account for any set of such probabilities having constituents greater than 0% and at least one constituent less than 100%.

6 Claims, 3 Drawing Sheets

METHOD OF OPTIMAL INFORMED TRADING WITH LIMITED COMPETITION

I. TECHNICAL BACKGROUND

The present invention relates to a method for maximizing profits when trading securities over the course of at least two trading periods of equal or varying duration. Typically, such methods are encoded onto digital media in an executable form to be executed by a computer processor once various inputs from a user or other sources have been provided.

More particularly, the present invention relates to a method for determining the optimal quantity of units of a security that should be traded during each of at least two trading periods such that the trader's total profit is maximized where, prior to executing a given trade transaction, the trader has accurate information regarding the true value of the securities to be traded, as well as knowledge of both the probabilities that the trader will engage in trade activity during subsequent trading periods and the correction effect that trade activity will exert on the market price of the securities to be traded.

II. BACKGROUND OF THE INVENTION

When a trader engages in trading securities, the market will adjust the per-unit market price of the securities being traded. The magnitude of the per-unit price adjustment will depend on the size of a given trade. Whether the price adjustment is positive or negative can be determined most basically by applying the theory of supply and demand. If units of a security are sold, the per-unit price of the security likely will decrease. Conversely, if the trader purchases units of a security, the per-unit price of the security likely will increase. In any event, the per-unit market price of a security at any point in time is ultimately determined by the net effect had on the market by the trade activity of many traders.

In an effort to gain an advantage over competing traders of a given security, many traders engage so-called informed trading. Informed traders often conduct research with the goal of locating and gathering data which provide information about the future potential of the security. Once pertinent data regarding the future potential of a security is located and gathered, it can be analyzed using a variety of mathematical and particularly statistical formulae. Once so analyzed, the trader gains valuable information regarding the accurate and true per-value of the security in the near future. The trader's data-analysis methods may indicate that the security's true per-unit value is substantially different than its per-unit market price near the time of the trader's calculations. In such a case, the trader will desire to profit as much as possible from the unique knowledge. But buying or selling too many shares during a trading period will induce the market to rapidly adjust the value of the security in the direction of the per-unit value calculated by the trader. This too rapid price adjustment would hinder subsequent attempts by the trader to profit by subsequent trades during that period. However, by buying or selling too few shares during a trading period, the trader likewise fails to realize the maximum profit from the unique knowledge and leaves opportunities for competing traders.

Thus, the trader in this situation faces the difficult problem of how to optimize the number of shares to be traded during a given trading period so as to maximize profit. In the past, several attempts have been made to address optimization problems related to the aforementioned scenario; however, none of those methods have done so in the advantageous manner of the present invention. Unlike previous methods, the present invention accounts for the effect on the current trading period by the trader's future trade activity when the trader has knowledge of the specific probabilities that the trader will engage in trade activity during subsequent trading periods.

Most recently, the Applicant published an article discussed a theory to justify in economic terms the legal regulation of that species of informed trading known as insider trading. Nicholas L. Georgakopoulos, *Insider Trading as a Transaction Cost: A Market Microstructure Justification and Optimization of Insider Trading Regulation*, 26 Conn. L. Rev. 1 (1993). Insider trading generally involves trading of securities by traders who have monopolistic power over their information. Such monopolistic power generally results because the information is not only non-public, but is known only by traders directly associated with or employed by entities having exclusive possession of information about the value of securities involved or having the power to effect a change in the price of the securities involved. Within his article, Georgakopoulos theorizes that insider trading, and informed trading generally, permits the informed trader to reap profits that take the form of transaction costs burdening uninformed trading. On that basis, Georgakopoulos applies theories of market economics and argues that the regulation of insider trading is necessary to both reduce those transaction costs and increase competition among informed traders because those who would engage in insider trading—corporate entities, as well their employees and shareholders—do not face sufficient incentives to prohibit insider trading themselves.

Within his analysis, Georgakopoulos puts forth equations known in the art of informed securities trading; specifically: (1) the per-unit price of a security after a trading period is equal to the per-unit price of the security before that trading period plus the product of market liquidity ratio and the net size of the trade transaction(s) which took place during that trading period; and (2) the profit after a given trading period is equal to the product of the net size of the trade transaction (s) during that trading period and the difference between the true per-unit value of the security as indicated by the trader's information and the per-unit market price of the security after the trading period. Georgakopoulos further discloses that if the resultant of equation (1) is substituted for the security's per-unit market price in equation (2) and then optimized by taking the derivative of the function with respect to transaction size and setting the derivative equal to zero, the perfectly competitive trader—i.e., one who does not expect to trade for a second time—can determine the optimal net size of the trade transaction(s) to execute during the trading period.

Georgakopoulos also discloses a scenario involving an informed trader who does not face competition but knows that trade activity will be limited to two trade transactions. If assumed to take place under the same market conditions as the single-trade transaction scenario discussed above, the trader's trade activity in this scenario involves a first trade transaction of necessarily smaller size than if it were the only trade transaction executed by the trader. Using equations (1) and (2) discussed above, and the additional knowledge that net profits will be equal to the sum of profits from both trades, the trader can determine the optimal respective size of both trade transactions. In presenting this scenario, Georgakopoulos assumes that the probability of the trader engaging in both trade transactions is 100%; he does not account for the fact that the trader may have knowledge that the probabilities are less than 100%, respectively, that the trader will engage in the second trade transaction or trade activity during one or more subsequent trading periods. Thus, Georgakopoulos does not extend to addressing the issue—mathematically or otherwise—of how informed traders can account for varying probabilities that they will engage in subsequent trade activity when attempting to optimize their trade activity so as to maximize the profit available as a result of their unique information. The probability of subsequent trades may also be illustrated as a function of the speed at which other traders become equally informed. For example, if during a trading period the possibility that other traders become equally well informed is 50%, then the probability of a subsequent trade may be taken as 0.5. A trader may observe evidence of other well informed traders by witnessing price movement in the direction suggested by the information that exceeds the predicted price shift. This unpredicted price movement may be taken as evidence of other well informed traders in the market, which may cause the hypothetical trader to change trading strategies in subsequent trades, e.g., to trade more aggressively, or to withhold participation.

Prior to Georgakopoulos, Anat R. Admati and Paul Pfleiderer published an article disclosing a method of determining the amount of competition that would exist in equilibrium in a sequence of auctions between informed traders and those trade transactions in which each informed trader should participate. Anat R. Admati & Paul Pfleiderer, *A Theory of Intraday Patterns. Volume and Price Variability*, 1 Rev. Fin. Stud. 3 (1988). Included in the Admati & Pfleiderer discussion is an analysis of the effect on periodic trading volume had by both informed traders—who presumably can optimize their trade activity according to methods such at that disclosed in Georgakopoulos—and liquidity traders—those whose trades are generally not optimized and executed as a result of subjective financial needs external to the market itself. But the thrust of Admati & Pfleiderer's analysis seeks only to explain in theoretical terms the phenomenon whereby trading volume in a given market often tends to cluster in certain periods of the day. Moreover, unlike the present invention, Admati & Pfleiderer does not disclose a model that can be used by informed traders to maximize the profit available as a result of their unique information in view of known probabilities of engaging in trade activity during future trading periods.

Prior to both Georgakopoulos and Admati & Pfleiderer, Albert S. Kyle published an article which discloses in pertinent part a model for determining the how quickly information regarding the true per-unit value of a security is incorporated into the security's actual per-unit price in the market. Albert S. Kyle, *Continuous Auctions and Insider Trading*, 53 Econometrica 1315 (1985). Kyle shows that such information is incorporated into the security's actual per-unit price in the market in a gradual manner when the informed trader is able to engage in optimal trade activity. Kyle also theorizes on the true value of private information to the informed trader. Kyle's analysis examines both a single trade transaction and multiple trade transactions occurring sequentially over the course of a single trading period—defined in Kyle's model as a single trading day. However, Kyle's analysis pertaining to multiple trade transactions occurring sequentially over the course of a single trading period implicitly assumes that each such transaction occurs with a constant probability of 100%. Thus, unlike the present invention, Kyle does not address the issue of how informed traders can account for varying probabilities that they will engage in subsequent trade activity when attempting to optimize their trade activity so as to maximize the profit available as a result of their unique information. Also unlike the present invention, Kyle posits that the security's true per-unit value will become public information at the end of the model's trading period whereas the spread of this information is explicitly modeled in the present invention.

The existing optimization methods for maximizing the profit available to informed securities traders fail to account for the informed trader's knowledge of the specific probabilities that the trader will engage in trade activity during more than a single trading period. As a result, the previous optimization methods are additionally unsatisfactory because they are incapable of producing accurate calculations prediction of a trader's net profit at the conclusion of trade activity.

What is needed in the art is an improved optimization method for maximizing the profit available to informed securities traders as a result of their unique information. Such a method would accurately account for the effect on a given trading period had by the trader's future trade activity when the trader has knowledge of the specific probabilities that the trader will engage in trade activity during one or more subsequent trading period(s). Furthermore, such a method would be effective for any set of such probabilities having constituents greater than 0% and at least one constituent less than 100%. While the method is described in terms of trading in securities, such as stock, share, bonds, options and the like, the method applies as well to trading in commodities, such as agricultural products, mineral products, fungible manufactured goods and the like in which a market is established among traders. For convenience the term "units" may be used hereafter as a description both securities and commodities.

An object of the present invention is to provide an improved optimization method for maximizing the profit available to an informed securities trader as a result of unique information from which the trader derives the true per-unit value of a given security.

A further object of the present invention is to provide an improved optimization method for maximizing the profit available to an informed securities trader as a result of unique information known by the trader with the intention to engage in subsequent trade activity during one or more subsequent trading period(s).

Another object of the present invention is to provide a method by which informed securities traders can account for the effect on a given trading period had by the trader's future trade activity when the trader has knowledge of the specific probabilities that the trader will engage in trade activity during one or more subsequent trading period(s).

Still another object of the present invention is to provide a method by which informed securities traders can account for the effect on a given trading period had by the trader's future trade activity when the trader has knowledge that the respective probabilities are greater than 0% and at least one such probability is less than 100% that the trader will engage in trade activity during one or more subsequent trading period(s).

A further object of the present invention is to provide a method by which an observer of activity of a trader comprising a sequence of trades may form an informed belief as to whether the trader acted on unique information.

Further objects and advantages of the present invention will become apparent as the description proceeds and the features of novelty which characterize the present invention will be pointed out with particularity in the claims annexed to and forming a part of the specification.

III. SUMMARY OF THE INVENTION

The present invention is a method of determining the optimal quantity of units of a security that would maximize a trader's total profits during a trading period where the trader intends to engage in subsequent trade activity during one or more subsequent trading periods. While the prior art discloses several methods by which an informed trader can attempt to optimize profits as a result of possessing information not generally known to other traders, each of the prior art methods depends upon whether the trader has advance knowledge as to the number of future trading periods during which the trader will engage in trade activity with a uniform probability of 100%. In contrast, the present invention permits a trader to determine the optimal quantity of units of a security that would maximize total profits during a trading period where the trader intends to engage in trading activity during subsequent trading periods with respective probabilities greater than 0% and at least one such probability less than 100%.

The user of this invention who is familiar with the art of securities trading will readily calculate a liquidity coefficient ($\lambda$) pertaining to the security. The liquidly coefficient is a known correction factor whereby the actual per-unit market price of the security increases or decreases incrementally in proportion to the number of shares traded. Further, the trader familiar with the art of securities trading may decide to employ a trading period with a duration different that a single trade for the application of this invention. The method of the present invention also enables the trader have knowledge of an initial per-unit market price of the security immediately prior to the initial trading period.

Upon determining the aforementioned values, the method of the present invention utilizes a recursive formula to calculate transactional size coefficients corresponding to each trading period in which the trader may participate by trading in the market. The recursive formula calculates transactional size coefficients in an order beginning with the transactional size coefficient corresponding to the final trading period and ending with the transactional size coefficient corresponding to the initial trading period. With the exception of the transactional size coefficient corresponding to the final trading period, the recursive formula calculates each transactional size coefficient as a function of the previously-calculated transactional size coefficients and the probability corresponding to each subsequent trading period. As for the final trading period, because the probability always is zero that the trader will engage in trade activity during trading periods subsequent to the chosen final trading period, the transactional size coefficient corresponding to the final trading period is always equal to one-half.

Upon calculating transactional size coefficients corresponding to each trading period, the method of the present invention calculates the optimal quantity of units of the security, which, if traded during the corresponding trading period, would maximize the informed trader's total profits. The optimal size of the trade activity during each trading period is determined as a function of the per-unit market price of the security immediately prior to the trading period for which the trade activity size is optimized, the security's true-per unit value, the liquidity coefficient and the transactional size coefficient corresponding to the trading period for which the size of the trade activity is optimized.

The optimal size of the trade activity corresponding to the initial trading period is calculated based on the initial per-unit market price of the security as determined immediately prior to the initial trading period. However, in order to calculate the optimal size of the trade activity corresponding to the trading period(s) subsequent to the initial trading period, the method of the present invention calculates a new per-unit market price of the security corresponding to each trading period. Each such new—or subsequential—per-unit market price calculated is reflective of the impact on the market had by the optimal trade activity corresponding to the preceding trading period(s). The subsequential per-unit market price corresponding to each trading period is calculated as a function of the immediately preceding per-unit market price, the optimal size of the trade activity corresponding to the preceding trading period and the liquidity coefficient.

Finally, the method of the present invention may be repeated in part if the subsequential per-unit price corresponding to the initial trading period is not equal to the actual per-unit market price of the security immediately subsequent to the initial trading period.

IV. BRIEF DESCRIPTION OF THE DRAWINGS

The aforementioned and other features and objects of this invention, and the manner of attaining them, will become apparent and the invention itself will be better understood by reference to the following description of several embodiments of the invention taken in conjunction with the accompanying drawings, wherein.

V. DETAILED DESCRIPTION OF THE PRESENT INVENTION

The embodiments discussed below are not intended to be exhaustive or to limit the invention to the precise form disclosed in the detailed description. Rather, the embodiments are chosen and described so that others skilled in the art might utilize their teachings.

Figure 1:
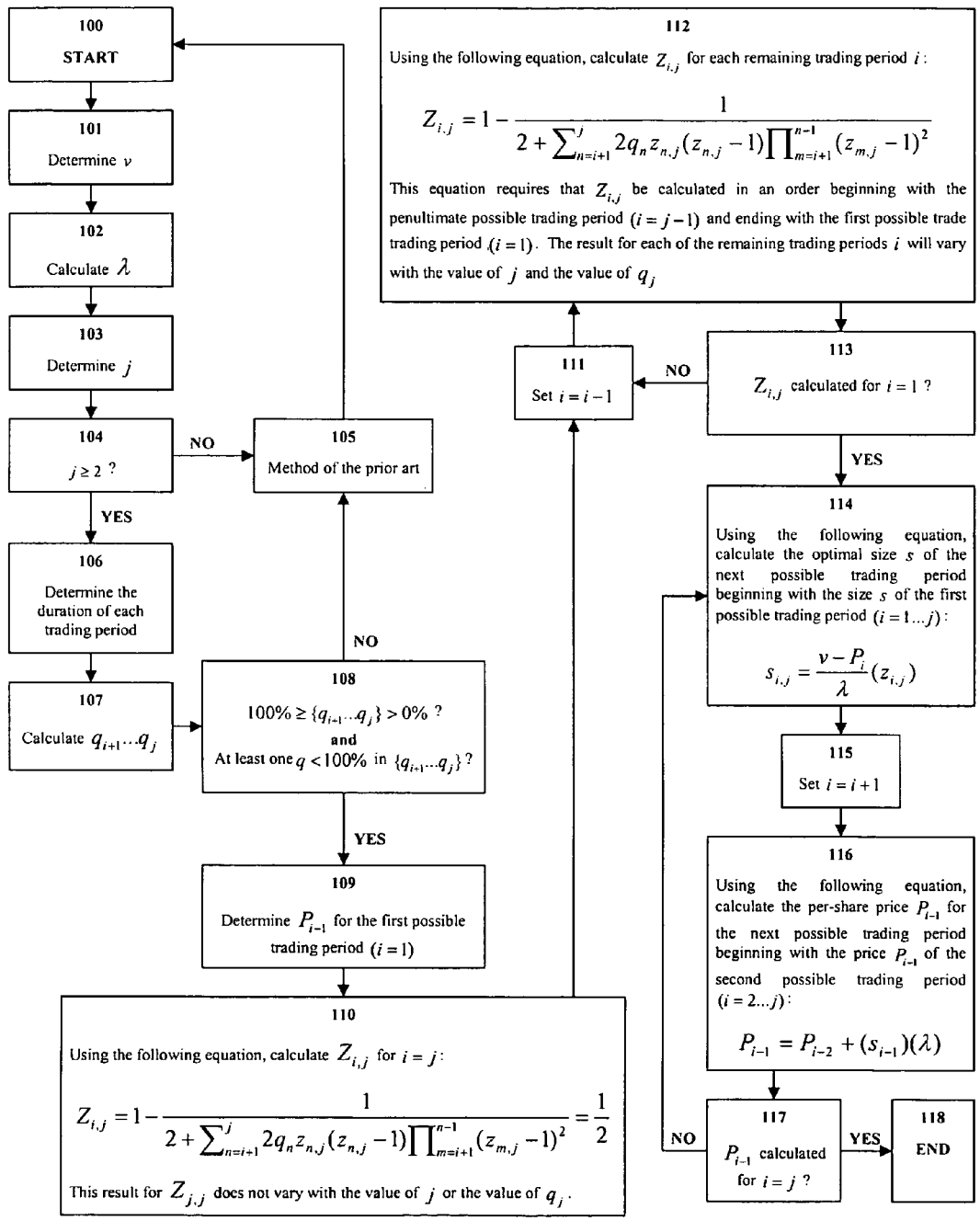
FIG. 1 is a flowchart comprised of blocks indicating the steps corresponding to a first embodiment of the method disclosed.

Referring to the drawings and particularly FIG. 1, a flowchart indicating the steps corresponding to a first embodiment of the method is provided. The method of the present invention starts (100) by determining a true-per unit value (101) of a given security—a value which, at the time of its calculation, is unlikely to be reflected in the actual per-unit market price (109) of the security. The true per-unit of the security may be calculated by an informed trader with the aid of data generally known to other traders. Such data be comprised of varied pieces of public information: corporate performance and financial statistics, such as those pertaining to sales or acquisitions of assets, capital disbursements, or expansion plans; third-party financial analyses or assessments; prospective large-scale transactions involving the security of interest; corporate regulatory filings and disclosures to the media; as well as other corporate-health indicators, such as adverse legal actions or bankruptcy filings. This list is by no means exclusive, however, and one skilled in the art of informed securities trading will understand that many more such data sources are available. Moreover, depending on the availability of timely and accurate data, the true per-unit value of the security known to the trader could be made to vary in successive trading periods as a function of the value change effect caused by the newly available data. The method of the present invention next calculates a liquidity coefficient (102) ($\lambda$) for the security. The liquidity coefficient (102) is a known—but not necessarily constant—correction ratio expressed in currency units per security units. The liquidity coefficient (102) reflects the amount that the security's price changes when a given number of shares are traded in a trading period. Each unique security likely will have its own liquidity coefficient (102). Those skilled in the art will be able to calculate the liquidity coefficient (102) for a given security based on such data as the security's historical market volumes and corresponding per-unit prices during various trading periods; of course, those skilled in the art will understand that the liquidity coefficient (102) could be calculated using different or additional market parameters as well. Those skilled in the art will also recognize that the liquidity coefficient (102) for a given security may vary from one trading period to the next as a function of the security's trading volumes or per-unit prices during one or more previous trading periods.

Continuing the description of the illustrated embodiment with reference to FIG. 1, the method next determines a possible quantity of total trading periods (103) in which the trader will engage, including an initial trading period. The method produces improved results when the possible quantity of total trading periods (103) is greater than or equal to two (104). If the possible quantity of total trading periods (103) is less than two, the method of the present invention emulates the prior art. The method of the present invention then determines the duration of each trading period (106). A trading period may involve a single trade transaction or multiple trade transactions. The net result of the trade transaction(s) executed during a single trading period is referred to herein as trade activity. Following the method, the duration of any one trading period may be defined in any unit of time or by any number of trade transactions; and, no single trading period must be equal in duration to any other. The method next determines for each trading period that would occur subsequent to the initial trading period a probability (107) that the trader will engage in trade activity during each of the subsequent trading periods. The probability (107) corresponding to each subsequent trading period need not be the same; and, where it is possible that the trader will engage in multiple subsequent trading periods, the probability (107) that the trader will engage in trade activity during each generally will remain constant or decrease with each successive trading period. Each probability within the set of all probabilities individually pertaining to each subsequent trading period must be greater than 0% and at least one probability in the set must be less than 100% (108). For example, if the total quantity of possible trading periods (103) is selected as four, the probability pertaining to the second possible trading period could be 100% only if the probabilities pertaining to the third and fourth possible trading periods were less than 100%, respectively. Thus, this example would be consistent with the requirements of the present invention if the probability pertaining to the third possible trading period was, e.g., 85% and the probability pertaining to the fourth possible trading was, e.g., 75%. If at least one probability within the set of all probabilities individually pertaining to each subsequent trading period is not less than 100% (108), the method of the present invention emulates the prior art (105). Thus, the total quantity of possible trading periods (103) is merely a "possible" quantity because the respective probabilities relating to the occurrence of individual trading periods may be less than 100%. The method of the present invention then determines a per-unit market price of the security (109). The per-unit market price of the security (109) is generally the per-unit price at which the security is being traded immediately prior to the initial trading period. Of course, one skilled in the art will recognize that the per-unit market price of the security (109) also could be calculated as the average of the security's per-unit price in one or more securities markets at a given point it time or over a predetermined period prior to the initial trading period.

Continuing the description of the illustrated embodiment with reference to FIG. 1, the method next calculates by means of a recursive formula (110) an ultimate transactional size coefficient corresponding to the final possible trading period. (The recursive formulas in blocks (110) and (112) are identical, but the iteration corresponding to the final trading period has been placed in a separate block (110) to highlight the fact that the recursive formula will always produce an ultimate transactional size coefficient equal to one-half.) Subsequently, the recursive formula (112) continues to calculate transactional size coefficients in an order beginning with the transactional size coefficient corresponding to the penultimate trading period and ending with the transactional size coefficient corresponding to the initial trading period. The recursive formula (112) calculates each transactional size coefficient as a function of the previously-calculated transactional size coefficients and the probability (107) corresponding to each subsequent trading period. However, because the probability always is zero that the trader will engage in trade activity during trading periods subsequent to the chosen final trading period, as mentioned above, the recursive formula (110) always produces an ultimate transactional size coefficient equal to one-half. Once the ultimate transactional size coefficient has been calculated by the recursive formula (110), the recursive formula (112) proceeds to calculate a penultimate transactional size coefficient corresponding to the pre-penultimate possible trading period. Thereafter, if the possible quantity of total trading periods is greater than two, the recursive formula (112) proceeds to calculate pre-penultimate transactional size coefficients corresponding to each of the remaining possible trading periods, completing only once it has calculated the pre-penultimate transactional size coefficient corresponding to the initial trading period. One skilled in the art will recognize that the recursive formula (112) is self-iterating for any number of counts greater than one, but for purposes of illustration, FIG. 1 shows block (111) reducing the first and each subsequent iteration by a single count; first after the calculation of the ultimate transactional size coefficient is completed by the recursive formula (110) and subsequently after the calculation of each remaining transactional size coefficient by the recursive formula (112) until the condition of block (113) is met. The condition of block (113) is met after the transactional size coefficient corresponding to the initial trading period has been calculated by the recursive formula (112).

The transactional size coefficient (Z) is calculated by subtracting from one a fraction. The fraction has as its numerator the value of one and as its denominator the sum of two components. The first component is the value of two. The second component is a sum of a variable number of terms. In the second component, the number of the sum's terms is equal to the number of subsequent trading periods, running from the subsequent trade (i+1) to the final trade (j) and indexed by n. Each term of the second component is the product of five sub-terms. The first sub-term of the product is the number two; the second sub-term is the probability of trading in each subsequent trading period ($q_n$); the third sub-term is the transactional size coefficient of each subsequent trading period ($Z_{nj}$); the fourth sub-term in a parenthesis is the transactional size coefficient of each subsequent trade minus one. The fifth sub-term of the product is itself a product of a variable number of items. The number of items is equal to the number of trading periods that intervene between the trade for which the transaction size coefficient is being calculated (i) and the trade to which the component of the sum corresponds, i.e., the sum's index "n". Namely, the product multiplies items from i+1 to n−1, indexed by m. The variable-length product has a single, potentially repeating term, the square of the difference of the corresponding transactional size coefficient ($Z_{m,j}$) minus one.

Continuing the description of the illustrated embodiment with reference to FIG. 1, the method of the present invention next utilizes an iterative size formula (114) to calculate the optimal quantity of units of the security, which, if traded during the corresponding trading period, would maximize the informed trader's total profits. The optimal size of the trade activity during each trading period (103) is determined by the iterative size formula (114) as a function of the immediately preceding per-unit market price of the security (calculated by an iterative price formula (116)—or, in the case of the initial trading period, equal to the per-unit market price (109)), the security's true-per unit value (101), the liquidity coefficient (102) and the transactional size coefficient (calculated by the recursive formula (112)—or, in the case of the ultimate transactional size coefficient, the recursive formula (110)) corresponding to the trading period for which the iterative size formula (114) is then optimizing the trade activity size. Thus, the iterative variables in the iterative size formula (114) include the per-unit market price of the security (calculated by the iterative price formula (116)—or, in the case of the initial trading period, equal to the per-unit market price (109)) and the transactional size coefficient (calculated by the recursive formula (112)—or, in the case of the ultimate transactional size coefficient, the recursive formula (110)). However, each of the transactional size coefficients required to complete the iterations of the iterative size formula (114) were calculated previously by the recursive formulas (110) and (112). Therefore, upon calculating the optimal size of the trade activity corresponding to the initial trading period, the method utilizes the iterative price formula (116) to calculate a subsequential per-unit market price of the security corresponding to each trading period (103). Each subsequential per-unit market price calculated by the iterative price formula (116) is reflective of the impact on the market had by the optimal trade activity corresponding to the preceding trading period(s). The subsequential per-unit market price corresponding to each trading period (103) is calculated by the iterative price formula (116) as a function the immediately preceding per-unit market price, the optimal size of the trade activity corresponding to the preceding trading period (calculated by the iterative size formula (114) and the liquidity coefficient (102). One skilled in the art will recognize that the iterative size formula (114) is self-iterating for any number of counts greater than one and when evaluated in conjunction with the iterative price formula (116), which is also self-iterating for any number of counts greater than one. However, for purposes of illustration, FIG. 1 shows block (115) increasing the iteration by a single count after the iterative size formula (114) calculates the optimal quantity of units of the security corresponding to each trading period (103). Similarly, for purposes of illustration, FIG. 1 also shows conditional block (117). The condition of block (117) is met—and the iterative size formula (114) cease to execute—once the iterative price formula (116) has calculated the subsequential per-unit market price corresponding to the final trading period. At that time, the method concludes (118). Of course, immediately thereafter, the method could be performed again, as someone skilled in the art would clearly do if the actual price at the end of a trading period differs from the price that the method computed for the same period. Because it easily could be encoded onto digital media in an executable form using any one of a variety of currently available means, one skilled in the art will understand that the method could be incorporated into computer software to be executed by a computer processor once various inputs from a user or other sources have been provided. Such sources may include other computer software or computer processors. Finally, one skilled in the art will understand that the method may be utilized for analytical and research purposes unrelated to trade activity. Alternately, the method may be utilized to conduct trade activity.

The following example demonstrates the use and the utility of the method.

Example 1

Figure 2:
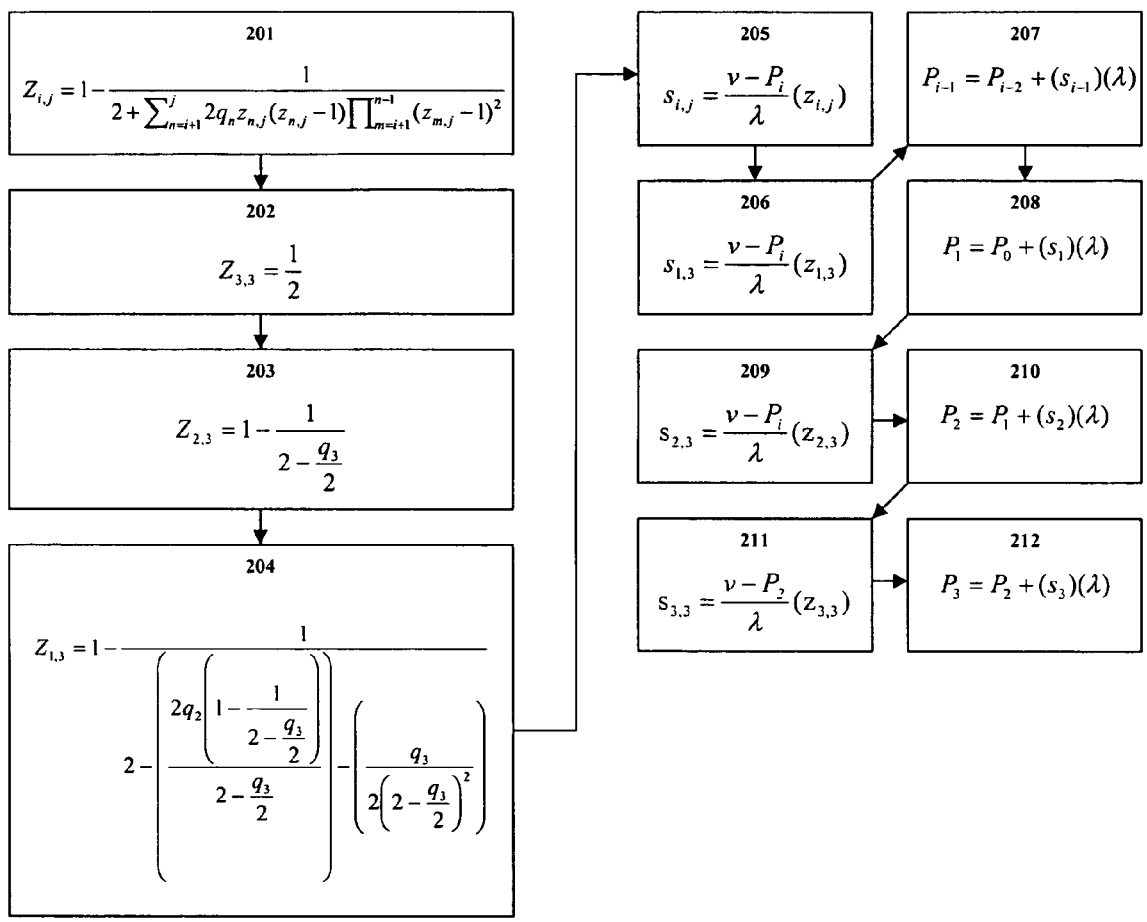
FIG. 2 is a flowchart comprised of blocks indicating the steps corresponding to the method of the present invention applied to a scenario involving the known probabilities of a second and third trading period occurring subsequent to an initial trading period.

Continuing the description of the illustrated embodiment, FIG. 2 provides an example corresponding to the method of the present invention whereby exemplary numerical parameters in paragraph [0037] are provided for a possible quantity of total trading periods equal to three. The method of the present invention is employed in FIG. 2 (201)-(212) over three possible trading periods.

Immediately after time 0, an informed trader determines that the true per-unit value (v) of a given security is $20. The trader determines that the per-unit market price ($P_0$) of the security is $10. The trader expects to engage in trade activity during the first trading period. However, the trader also expects to engage in trade activity during the second trading period with a probability (q2) of 0.75 and the third trading period with a probability (q3) of 0.65. Thus, the possible quantity of total trading periods (j) is 3. Finally, the trader knows from examining trading history that on average, a purchase of 1,000 units the trader buys the per-unit price increases by $1.00 in the chosen time interval (e.g., one trade, an hour, or a day, etc.); thus, the trader knows that the liquidity coefficient (λ) associated with the trade activity is equal to 0.001. Using the method to evaluate the parameters in paragraph [0037], the transactional size coefficients may be calculated using the recursive formula (201). The ultimate transactional size coefficient (202) is 0.5 regardless of the parameters for which the recursive formula (201) is evaluated. Generation of the penultimate transactional size coefficient (203) starting from formula 201 is illustrated first with the iterative values i, j, m and n included which generates the expression $$Z_{2,3} = 1 - \cfrac{1}{2 + \sum_3^3 2q_3 z_{3,3}(z_{3,3} - 1) \underbrace{\prod_4^2 (z_{m,j} - 1)^2}_{\text{No product because the sequence is reversed (from 4 to 2)}}}$$

Next, including the values chosen for the variables for this illustration generates:

$$Z_{2,3} = 1 - \frac{1}{2 + 2(0.65)(0.5)(0.5 - 1)}$$

Working through the math of the expression immediately above generates the value 0.4029 for the penultimate transactional size coefficient (203).

Continuing with the illustration, starting from the penultimate size coefficient and expressing formula 202 with the iterative values i, j, m, and n included generates:

$$Z_{1,3} = 1 - \cfrac{1}{\underbrace{\cfrac{2 + 2q_2 z_{2,3}(z_{2,3} - 1)}{n=2}}_{\substack{m\ from\ 2\ to\ 1 \\ (n-1), therefore \\ no\ product}} + \underbrace{\cfrac{2q_3 z_{3,3}(z_{3,3} - 1)(z_{2,3} - 1)^2}{n=3}}_{m\ from\ 2\ to\ 2}}$$

Including the variable values chosen for this illustration and the penultimate value calculated for the transactional size coefficient generates:

$$= 1 - \cfrac{1}{\begin{array}{c} 2 + 2(0.75)(0.4029)(0.4029 - 1) + \\ 2(0.65)(0.5)(0.5 - 1)(0.4029 - 1)^2 \end{array}}$$

Running the math generates the pre-penultimate transactional size coefficient (204), 0.343521. The optimal size of the trade activity during each trading period may be calculated using the iterative size formula (205). The optimal size of the trade activity during the first trading period (206) is equal to 3435.21 units. The subsequential per-unit market price of the security corresponding to each trading period may be calculated using the iterative price formula (207). The subsequential per-unit market price of the security after the first trading period (208) is $13.4352. The optimal size of the trade activity during the second trading period (209) is 2645.51 units. The subsequential per-unit market price of the security after the second trading period (210) is $16.0807. The optimal size of the trade activity during the third trading period (211) is 1959.64 units. Finally, the subsequential per-unit market price of the security after the third trading period (212) is $18.0404.

As illustrated by Example 1, the exemplary parameters (paragraph [0037]) provide in numerical form a true-per unit value of a given security as determined by an informed trader, the per-unit market price of the security, a possible quantity of total trading periods equal to three, the probabilities that the trader will participate in the trading period subsequent to an initial trading period, and the liquidity coefficient associated with the security. Once the aforementioned parameters are set, the example begins with the recursive formula (201) and proceeds to calculate the ultimate transactional size coefficient (202), followed by the penultimate transactional size coefficient (203), and finally the sole pre-penultimate transactional size coefficient (204). Once each of the three transactional size coefficients are calculated, the example proceeds to the iterative size formula (205) and calculates the optimal size of the trade activity during the first trading period (206). The example then proceeds to the iterative price formula (207) and calculates the subsequential per-unit market price of the security corresponding to the first trading period (208). Thereafter, the example calculates the optimal size of the trade activity during the second trading period (209), the subsequential per-unit market price of the security corresponding to the second trading period (210), the optimal size of the trade activity during the third trading period (211), and finally the subsequential per-unit market price of the security corresponding to the third trading period (212). The numerical results of the present method's operation calculated in paragraph [0039] are based on substituting the variables in each step for the corresponding numerical parameters chosen in paragraph Based on the numerical results of the present method's operation in paragraph [0039], one skilled in the art will realize that if one engaged in the optimal trade activity during a given trading period, then one may be forced to round the optimal number of units to the nearest whole number in order to avoid a trade transaction involving a fraction of a security unit; however, such rounding will not be necessary in every securities market.

Figure 3:
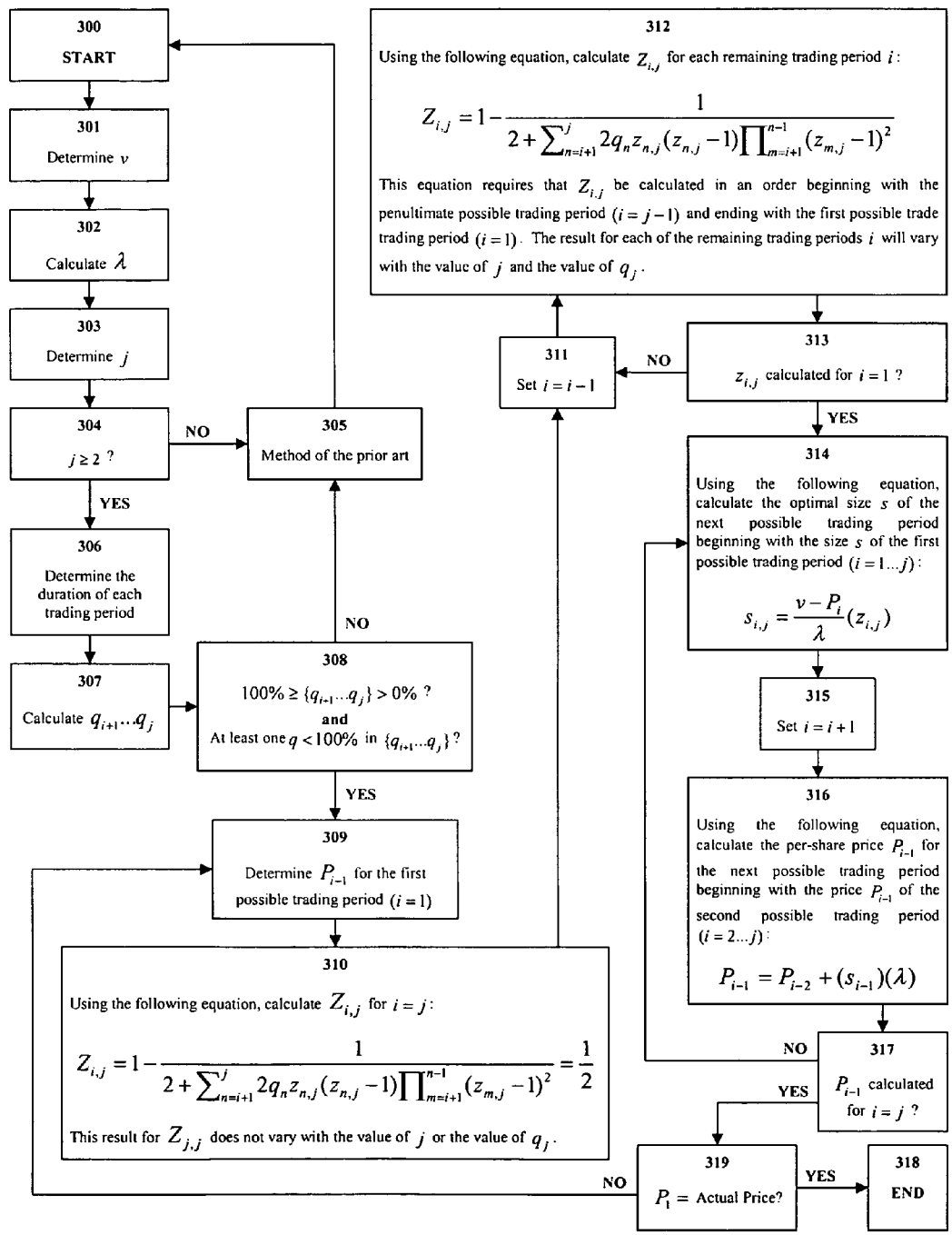
FIG. 3 is a flowchart comprised of blocks indicating the steps corresponding to a second embodiment of the method disclosed.

Continuing the description of the illustrated embodiment, FIG. 3 provides a flowchart indicating the steps corresponding to a second embodiment of the method of the present invention. Blocks (300)-(318) in FIG. 3 are identical to blocks (100)-(118) in FIG. 1. However, conditional block (319) adds an additional conditional test step to the method of the present invention. Conditional block (319) determines whether the subsequential per-unit market price calculated to correspond to the first trading period is equal to the actual per-unit market price of the security immediately subsequent to the first trading period. If such equality exists, the method concludes (318). However, if the equality does not exist, the method restarts by determining an initial per-unit market price for the security (309). This embodiment necessarily enables the trader engage in trade activity during the first trading period to trade the optimal number of units of the security corresponding to the first trading period as determined by the iterative size formula (314). For, if the trader does not engage in the optimal trade activity during the first trading period, the actual market price may bear no relation to his utilization of the method of the present embodiment.

While this invention has been described as having an exemplary configuration of steps, the method of the present invention may be further modified within the sprit and scope of this disclosure. This application is therefore intended to cover any variations, uses, or adaptations of the invention using its general principles. Further, this application is intended to cover such departures from the present disclosure as come within known or customary practice in the art of informed trading.

Example 2

A forensics examiner will have knowledge of the number of trading periods of interest, the price of the security as of the initial trading period of interest, and the security price as of the last trading period of interest. For purposes of a forensic inquiry, the security price as of the last trading period of interest may be taken as the value of the security.

Forensics examiners identify trading of interest in the security of Example 1. A skilled trader believing that the value of the security is $20, while the security trades initially at $10 exercises trades purchasing 3,500 units followed by one further trade at 2,600 units. The liquidity coefficient is established at 0.001. The forensics examiner, being uncertain whether the trader contemplated trading repeatedly, selects a probability of 0.5 that the trader would engage in a trade subsequent to the actual last trade.

The trades were significantly smaller than the size of trades that would generate maximum profit in two trades: 5000, and 3300 units, respectively. The forensic investigator may urge that the lower trading volume suggests that the skilled trader contemplated further trading and that the skilled trader held the belief that the $20 value of the security would remain generally unknown.

The forensics examiner may use the comparison of the optimum number of units to maximize the price with the actual trade history as a factor in making a judgment as to whether the trader was trading on unique information. If warranted, a further investigation may disclose if the unique information was publicly available, or possibly originated from an 'insider'.

The invention claimed is:

1. A method of determining the optimal number of units to be traded in a sequence of trading periods, given the probability of trading in each period where the probability of a trade in at least one trading period is less than one hundred percent, the method comprising the steps of:

receiving a number of chronologically spaced trading periods, the number of trading periods being at least three trading periods including an ultimate trading period, a penultimate trading period, and an antepenultimate trading period;

receiving for each of the trading periods a probability of trading during that trading period, each probability being greater than zero percent and at least one of the probabilities being less than one hundred percent; and determining with a computer processor an optimal number of units to be traded in the penultimate trading period of the number of trading periods based on information which in part determines a number of units to be traded in the ultimate trading period of the number of trading periods and on the probability of trading during the ultimate trading period, wherein each of the trading periods has a corresponding transactional size coefficient of the trading period, the transactional size coefficient for each trading period being determined according to the following relationship:

$$z_{i,j} = 1 - \frac{1}{2 + \sum_{n=i+1}^{j} 2q_n z_{n,j}(z_{n,j} - 1) \prod_{m=i+1}^{n-1} (z_{m,j} - 1)^2}$$

wherein i is the number of trading periods, $z_{i,j}$ is the transactional coefficient of a given trading period and $g_n$ is the probability of trading during a first trading period subsequent to the given trading period.

2. The method of claim 1, wherein a quantity of units to trade in the given trading period is determined by a product of the transactional size coefficient for the given trading period and a fractional quantity having a numerator which is a difference between a true per-unit value price and a price per unit of a preceding trading period and a denominator which is a liquidity value.

3. The method of claim 1, wherein the transactional size coefficient for the ultimate trading period is equal to 0.5.

4. The method of claim 3, wherein the transactional size coefficient for the penultimate trading period is determined according to the following relationship:

$$z_{(j-1),j} = 1 - \frac{1}{2 + 2q_j z_{j,j}(z_{j,j} - 1)}$$

\wherein $z_{(j-1),j}$ is the transactional coefficient of the penultimate trading period, $q_j$ is the probability of trading during the ultimate trading period, and $z_{j,j}$ is the transactional coefficient of the ultimate trading period.

5. The method of claim 4, wherein the transactional size coefficient for the antepenultimate trading period is determined according to the following relationship:

$$z_{(j-2),j} = 1 - \frac{1}{(2 + 2q_{j-1} z_{j-1,j}(z_{j-1,j} - 1)) + (2 + 2q_j z_{j,j}(z_{j,j} - 1)(z_{j-1,j} - 1)^2)}$$

wherein $z_{(j-2),j}$ is the transactional coefficient of the antepenultimate trading period and $q_{j-i}$ is the probability of trading during the penultimate trading period.

6. The method of claim 5, wherein a quantity of units to trade in the given trading period being determined by a product of the transactional size coefficient for the given trading period and a fractional quantity having a numerator which is a difference between a true per-unit value price and a price per unit of a preceding trading period and a denominator which is a liquidity value.

* * * * *

UNITED STATES PATENT AND TRADEMARK OFFICE
CERTIFICATE OF CORRECTION

PATENT NO. : 7,765,145 B2 Page 1 of 1
APPLICATION NO. : 11/104352
DATED : July 27, 2010
INVENTOR(S) : Nicholas L. Georgakopoulos It is certified that error appears in the above-identified patent and that said Letters Patent is hereby corrected as shown below:

Title Page, Item (22) the filing date should be April 12, 2005.

In Column 13, line 39, the letter "i" should be "j".

In Column 13, line 40, the letter "g" should be "q".

Signed and Sealed this

Nineteenth Day of October, 2010

David J. Kappos
*Director of the United States Patent and Trademark Office*